Dec. 7, 1937. E. M. MORROW ET AL 2,101,506
PROCESS OF MAKING DEHYDRATED POTATO CHIPS
Filed Sept. 10, 1934
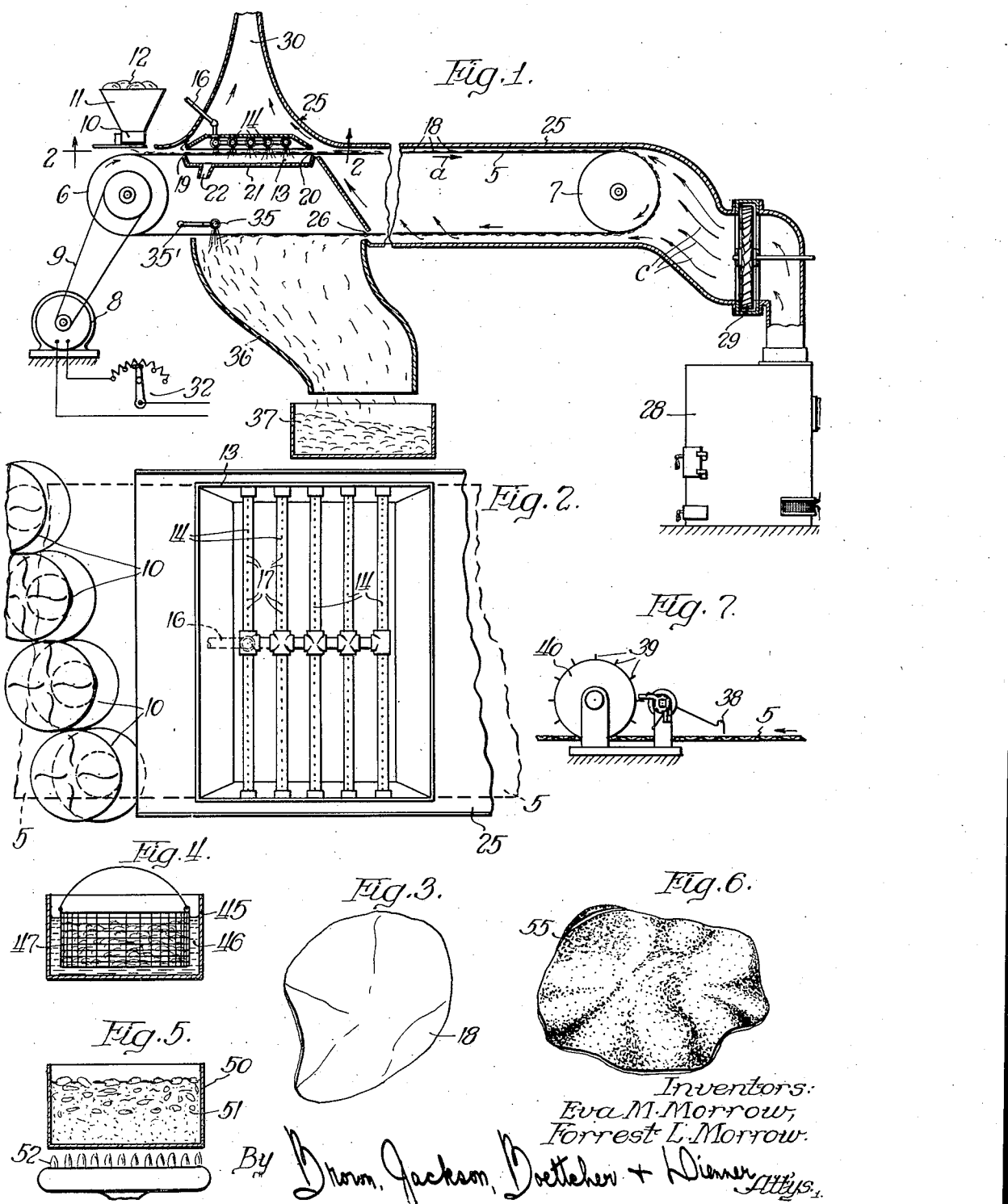

Patented Dec. 7, 1937

2,101,506

UNITED STATES PATENT OFFICE 2,101,506

PROCESS OF MAKING DEHYDRATED POTATO CHIPS

Eva M. Morrow and Forrest L. Morrow, Elgin, Ill.

Application September 10, 1934, Serial No. 743,366

2 Claims. (Cl. 99—100)

This invention relates to dehydrated potato chips.

Dehydrated sliced potatoes for use in making fried potatoes are old in the art. They have been found to be of great convenience because their use obviated the necessity of peeling and trimming. In the manufacture of dried sliced potatoes for this purpose as heretofore practiced, the tubers have been peeled, trimmed, sliced from one-eighth to one-quarter inch thick, parboiled, and dried. The principal disadvantage lies in the fact that they require "refreshing" (soaking) in water for several hours before cooking. They have not been suitable for cooking to a satisfactory crisp condition. The soaking in water for such a time washes out desirable mineral salts, protein and starches, thus removing valuable food qualities from the potatoes. And if the relatively thick potato slices are allowed to remain in water too long they tend to fall apart in the cooking process.

The object of the present invention is the provision of a dehydrated chip suitable for cooking to a crisp condition, but remaining integral, when immersed in water, taken out instantly and dropped into an oily liquid at a temperature over 250° F., and process of making the same.

The invention is illustrated in the accompanying drawing, in which:

Figure 1 is a diagrammatic longitudinal sectional view through an apparatus suitable for carrying out the process and producing the chips of my present invention;

Figure 2 is a fragmentary bottom view, partially in section, showing the arrangement of the slicers and the steam pipes of the steam chamber;

Figure 3 is a view showing one of the finished dehydrated chips;

Figure 4 shows the step of immersing the dehydrated chips in water;

Figure 5 shows, diagrammatically, the step of cooking the chips in hot grease;

Figure 6 is a view similar to Figure 3 showing one of the cooked chips; and

Figure 7 is a fragmentary view showing an alternative arrangement for forcibly removing the chips from the lower run of the moving belt after they leave the drying chamber.

Referring to the drawing, the illustrated apparatus for carrying out the process and producing the dehydrated chips of our present invention comprises a moving belt 5 trained about pulleys 6 and 7. The belt 5 is preferably formed of wire mesh belting with meshes of one-quarter to one-half of an inch (three-quarters of an inch meshes may be used) which allows a quicker drying than a solid belt. Belting of this sort is commonly known in the art as woven wire hardware cloth. Other forms of belting may, of course, be used within the spirit and scope of my present invention. The belt 5 is driven in the direction indicated by the arrow a, for example by a motor 8 drivingly connected at 9 to the pulley 6, or it may be driven by means of link belt chains at either side across which cross members are placed at regular intervals and to which the wire belt may be fastened, or in any other suitable or preferred manner.

At one end of the upper run of the moving belt 5 are a plurality of slicers 10. These slicers 10 may be of any form suitable for cutting the potatoes into slices of the desired thickness, as will hereinafter appear. Many kinds of such slicers are now on the market. Where the chip making capacity is not large, one of such slicers may be used, and therefore one or any desired number of slicers are contemplated within the scope of the appended claims. Where there are a plurality of slicers, they are arranged in close formation to drop the slices upon the top of the upper run of the belt 5 so that they will not touch each other, yet will cover most of the width of the belt. Where there are a plurality of slicers, they are preferably driven as one unit, and means in the form of hoppers 11 may be provided for keeping a continuous supply of raw potatoes 12 in the slicers. The slicers 10 are timed with respect to the moving belt 5 so that the slices, as they drop upon the belt, are carried forward out of the way of the succeeding slices, thus placing the slices upon the belt in rows as close together as possible without overlapping and with the slices in each row as close together as possible without overlapping. To bring the sliced pieces of potato close together, the slicers 10 may be arranged obliquely across the belt 5, as shown in Figure 2.

Forwardly of the slicers 10, the upper run of the belt 5 travels through a steam chamber 13. This chamber 13 extends transversely across the entire width of the belt 5, and may be of a length from ten feet to twenty feet, or of any other suitable dimensions, depending upon the speed of the belt 5 which, in turn, depends upon the capacity of the machine or the quantity of chips which it is desired to produce. The steam chamber 13 is built only large enough to contain the steam pipes 14 which are arranged transversely across the belt relatively close together. A steam inlet pipe 16, connected to the pipes 14, delivers steam into these pipes. The bottom surfaces of the pipes 14 have one or two rows of small holes or perforations 17 about one-sixteenth of an inch in diameter so that the steam will spray directly downward upon the chips 18 as they move away from the slicers 10. The chamber 13 is open only sufficiently at either end at 19 and 20 to allow the belt 5 to move freely through the chamber. The sides of the chamber 13 extend down and connect with a water-tight bottom 21 which acts as a receptacle for holding the water from the condensation of the steam, and a pipe 22 is connected to drain off the water.

Forwardly of the steam chamber 13, the belt 5 travels within a drying chamber 25. This chamber 25 may be from 100 feet to 500 feet in length, or of any other suitable size, depending upon the chip-making capacity desired. It is practically airtight and built so that the air must travel close to the belt 5 at all times, thus allowing the greatest amount of moisture to be picked up by the heated air. The upper run of the belt 5 enters the chamber 25 at 20, and the lower run of the belt leaves the chamber 25 at 26. The pulley 7 is disposed within the chamber 25, and air sealing provisions may be made at the belt inlet 20 and at the belt outlet 26.

In the illustrated embodiment, heated air is driven through the drying chamber 25 from the end of the belt 5 opposite the end at which the slicers 10 are arranged and counter to the travel of the upper run of the belt 5 through this chamber. The heated air may be circulated in any direction within the scope of the broader of the appended claims. The air may be heated by suitable means, as, for example, a furnace or heater 28, and is driven by a blower or blowers 29 through the belt 5 and outward in the direction indicated by the arrows c moving past the inlet 20 for the entry of the belt from the steam chamber 13 to the drying chamber 25 and carrying off the surplus steam that escapes from the steam chamber. This air is carried entirely outside the building by an outlet 30 which prevents the moisture-laden air from being used again.

According to the present invention, the raw potatoes 12 are sliced to a thickness from approximately one-twentieth to approximately one-thirtieth of an inch, preferably to a thickness of approximately one-twenty-fifth of an inch, and from the slicers 10 the thin raw slices drop upon the moving belt 5. As the belt travels through the semi-enclosed steam chamber 13, live steam of 212° F. or over, or approximately thirty pounds pressure, is sprayed from the pipes 14 in such manner that the steam is thoroughly sprayed over the chips 18 as they travel ahead. This steam treatment of the chips is for the purpose of semi-cooking them. It glazes or blanches the chips and provides a preserving coating. The speed of the belt may be regulated, by regulating at 32 the speed of the motor 8 or otherwise, to allow for variation in the quality of the potatoes as to the time necessary for reaching the proper cooked or semi-cooked stage. A period of about two minutes in the steam zone is suitable for some potatoes, but this will vary with different potatoes.

From the steam chamber 13 the cooked or semi-cooked chips 18 are carried to the drying chamber 25 where the air is heated to temperatures from 150° to 300° F. The length of the belt 5 and the chamber 25 are preferably sufficient to allow the chips 18 to become dried to approximately ninety-four per cent (meaning only six per cent water remaining). This is desirable to assure that the chips will remain in the dried state and not become colored (darker). Chips dried to this stage will remain in the same state for many years and may be packaged and distributed for use in airtight containers or otherwise as desired. One of the dehydrated chips, after removal from the belt 5, is shown at 18 in Figure 3.

Under certain conditions, the cooking or semi-cooking of the chips causes them to stick to the belt 5. For the purpose of removing the chips from the belt by force, a pipe 35, having perforations along its bottom surface, may be arranged close to the top side of the bottom run of the belt 5, rearwardly of the drying chamber 25, so that upon releasing compressed air into the pipe 35, as by means of a control valve (not shown), the air escaping through the perforations in the bottom of the pipe will come into contact at once with the top sides of the chips 18 clinging to the bottom of the lower run of the belt 5 with such force as to expel the chips from the belt. As the chips are removed from the belt 5 after leaving the drying chamber 25, they may be delivered, for example, through a chute 36 to a suitable container 37. The compressed air inlet for the pipe 35 is shown at 35'.

Instead of the compressed air arrangement for removing the chips from the belt 5, a mechanical row of wire fingers 38 (Figure 7) may be arranged to be raised and lowered at regular intervals, as by means of fingers 39 or cam means on a revolving wheel 40. When the wire fingers 38 are in lowered position they pass downwardly and extend through the wire belt 5 to force the chips 18 from the bottom or under side of the lower run of the belt after they leave the drying chamber 25.

The dehydrated chips 18 may be sold to the public in the condition shown in Figure 3, and are prepared or brought to condition to eat as and when desired by dropping the chips in hot grease or in a hot oily liquid.

Preferably, before cooking the chips in hot grease, they are dropped into water and taken out instantly. This step is shown in Figure 4 in which the vessel 45 contains a body of water 46. The dehydrated chips to be cooked may be placed in a wire basket or other open work container 47 which is dropped into the water 46 and instantly removed. This refreshes the dehydrated chips and loosens up the entire sections of the same so that they may be cooked by dropping them into hot grease or into a hot oily liquid. Because of the thinness of the chips, they may be immersed in the body of water and instantly removed without soaking for great intervals. This prepares the chips for cooking and it does it without the loss of time in soaking for long periods, as well as without washing out desirable mineral salts.

Upon completion of the chip shown in Figure 4, the chips are ready to be cooked by dropping them into a hot oily liquid. This step is shown in Figure 5 in which the vessel 50 contains a body of hot grease or oil 51 which is brought to a temperature of from approximately 350° F. to approximately 400° F. in the vessel 50 as by means of a suitable burner or heater 52. This temperature range has been found preferable, but any temperature that will cook the chips upon dropping them into the hot oily liquid, without leaving the chips soggy and without burning, may be employed.

Upon bringing the grease or oily liquid to the desired temperature, the chips are dropped therein and are cooked in a short interval of time. In small quantities the dehydrated chips of the present invention may be cooked in the hot oily liquid in as little time as five seconds. Cooking intervals of from approximately five seconds to approximately one minute are now contemplated, but this may vary. The chips are cooked to a crisp condition without cooking them so long that their fibers would be broken or destroyed. As a result the cooked crisp chips do not fall apart but remain integral. Upon being cooked in the body of hot oil 51, the chips are ready to eat. They float upon the surface of the oily liquid 51 and may be removed and sold as desired. One of the cooked chips is shown at 55 in Figure 6. The cooked product is a crisp, curled and irregular-shaped browned chip, and is to be distinguished from thicker fried potatoes and the like.

We claim:

1. The process of making potato chips which comprises dividing a potato into thin pieces, subjecting the thin pieces to steam treatment to semi-cook the same to a glazed or blanched condition, dehydrating the thin pieces, immersing said thin pieces in water only momentarily and without prolonged soaking to rehydrate the same, and thereafter cooking said thin rehydrated pieces into the form of thin, crisp potato chips by immersing the same in oil at a temperature over 250° F.

2. The process of making potato chips which comprises dividing a potato into thin pieces, subjecting the thin pieces to steam treatment to semi-cook the same to a glazed or blanched condition, dehydrating the thin pieces, and thereafter cooking said thin pieces into the form of thin crisp potato chips by immersing the same in oil at a temperature over 250° F. and without, prior to such cooking, soaking said pieces in water for a prolonged period of time.

EVA M. MORROW.
FORREST L. MORROW.